United States Patent [19]
Johnson

[11] Patent Number: 5,187,586
[45] Date of Patent: Feb. 16, 1993

[54] MOTION PICTURE ENVIRONMENT SIMULATOR FOR TELEVISION SETS

[76] Inventor: Milton Johnson, 9034 Lindblade St., Culver City, Calif. 90232

[21] Appl. No.: 684,115

[22] Filed: Apr. 12, 1991

[51] Int. Cl.⁵ .............................................. H04N 5/64
[52] U.S. Cl. .................................... 358/254; 358/83
[58] Field of Search ................... 358/255, 254, 83, 93; 351/43, 45

[56] References Cited

U.S. PATENT DOCUMENTS

| | | | |
|---|---|---|---|
| 1,831,817 | 11/1931 | McGill et al. | 358/254 |
| 2,955,156 | 10/1960 | Heilig | 358/83 X |
| 3,257,507 | 6/1966 | Borberg et al. | 358/255 |
| 3,261,652 | 7/1966 | Magnus | 351/45 X |

Primary Examiner—Victor R. Kostak
Attorney, Agent, or Firm—Julius Rubinstein

[57] ABSTRACT

A television viewing device for simulating the environment of a motion picture theater comprising in combination a viewing screen having an opening formed therein sized to expose the television tube. A pair of glasses like frames is used with the viewing screen. These frames having light blocking shields for preventing ambient light in the room in a home where a television set is situated from entering the eyes of the viewer through the top, bottom and sides of the frame. A light blocking shield is mounted in front of the frame in place of the glasses. This shield is provided with a narrow slit which can be varied in size, through which light from the viewing screen and television tube can be viewed. The surface of the viewing screen facing the viewer painted black so the only light visible to the viewer comes from the viewing screen, whereby the environment of a motion picture theater can be simulated in the home.

10 Claims, 2 Drawing Sheets

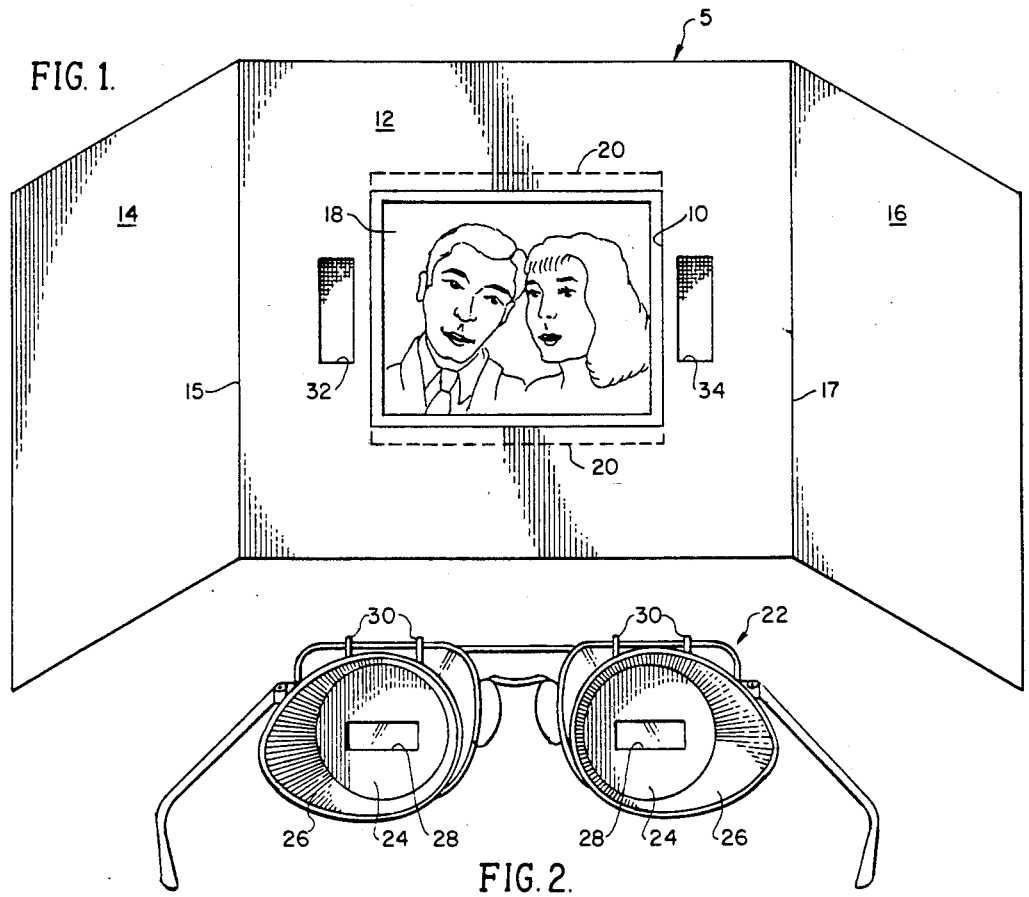
FIG. 1.
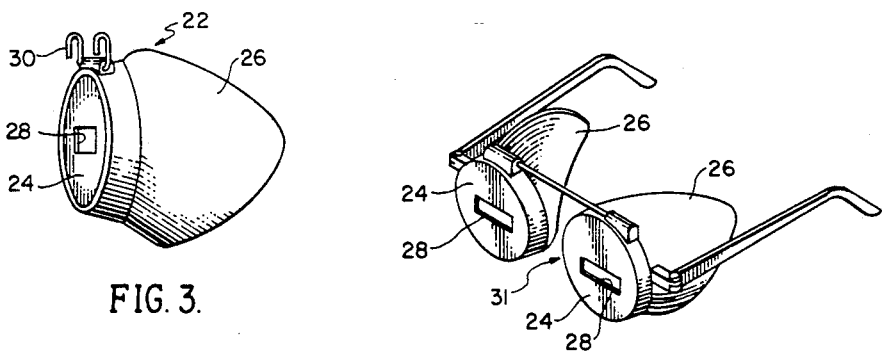
FIG. 2.
FIG. 3.
FIG. 4.

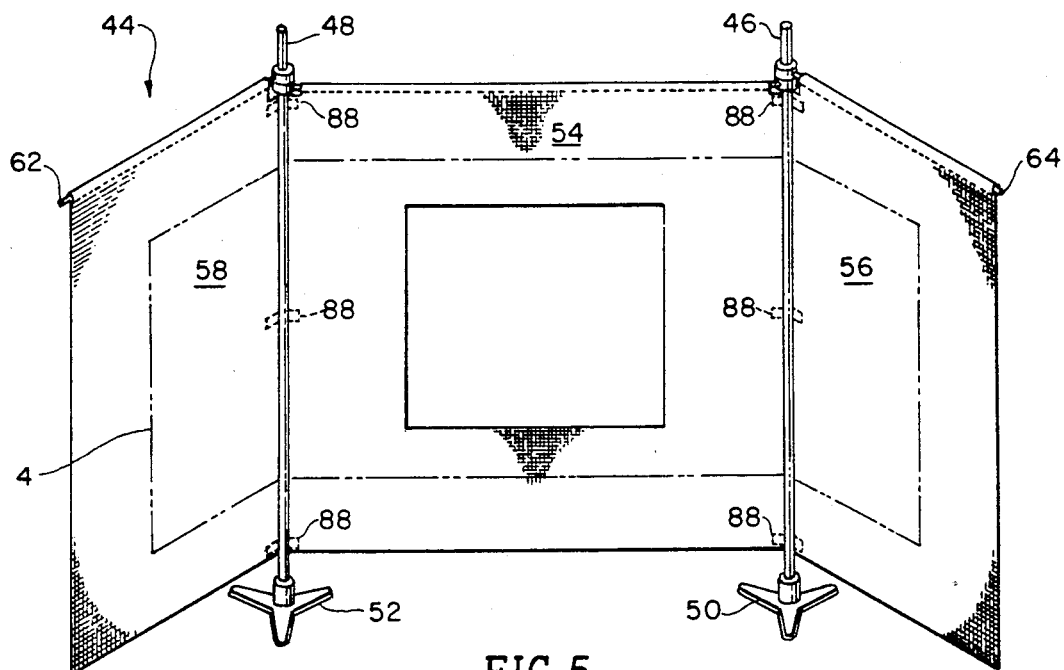
FIG. 5.
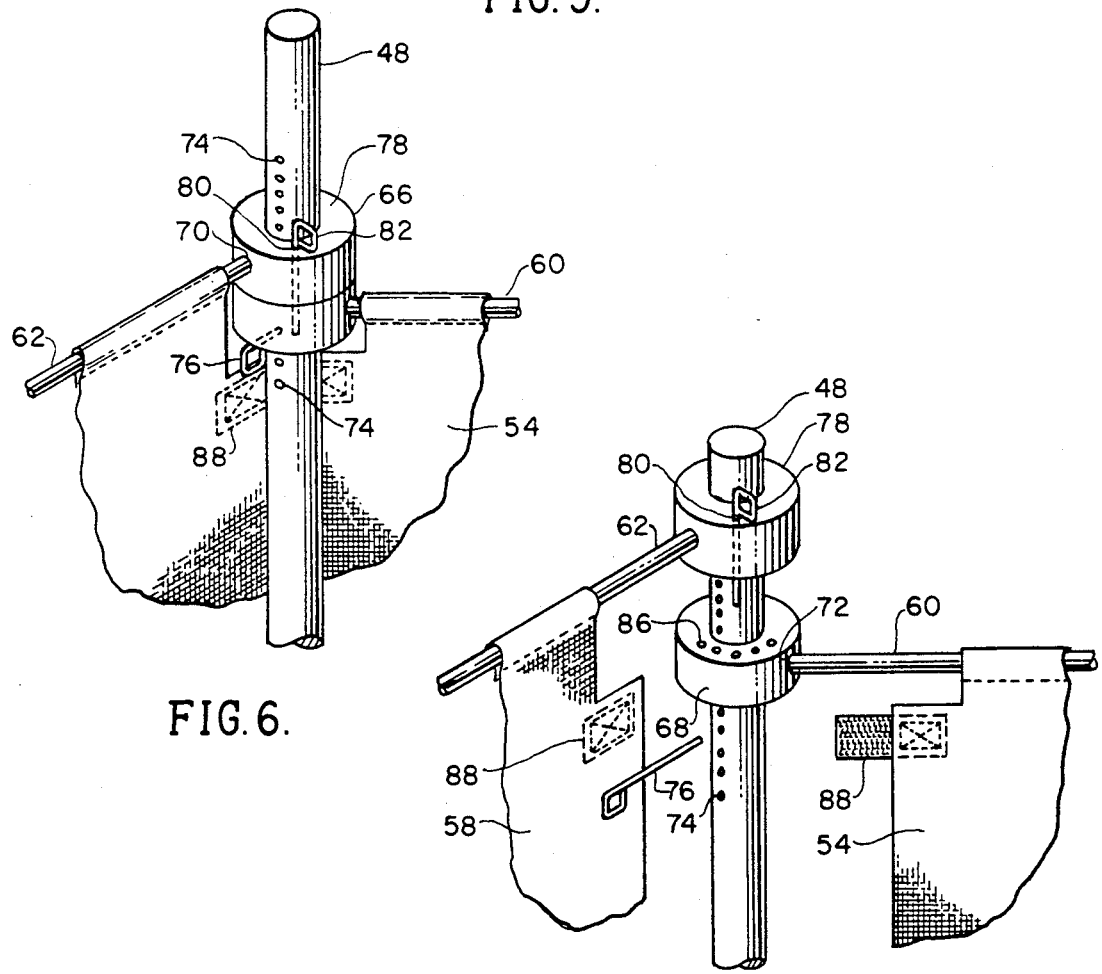
FIG. 6.
FIG. 7.

MOTION PICTURE ENVIRONMENT SIMULATOR FOR TELEVISION SETS

This invention relates to a television viewing device and more particularly to a motion picture environment simulator.

RELATED APPLICATIONS

There are no related applications.

FEDERALLY SPONSORED RESEARCH

There is no federally sponsored research connected with this application.

BACKGROUND OF INVENTION

This invention relates to a device which simulates the environment of a motion picture theater when viewing a television set.

A motion picture theater is generally almost completely dark with only the motion picture on the screen illuminated for best viewing of the motion picture. This can be simulated in the home by running a video tape showing a motion picture on a television set, by turning off all the lights in the room, so the room is almost completely dark. But this is not always practical because other people may be using the room. If the room is not almost completely dark, the picture on the television set would not be comparable with the picture being viewed in a motion picture theater.

RELATED ART

Heretofore, as exemplified by the patents to Leffler et al U.S. Pat. No. 155,432, Giulie # 2,633,324, and Rose # 2,496,752 devices attached to a television screen or CRT tube were developed to reduce glare and the effect of light in the room. However these patents could not duplicate the environment of a motion picture theater because of the light in the room Other devices such as the patents to Barr #2,433,590, Wilstein #3,225,459, Stowell #1,141,432, Douglass #2,662,021, Capper #1,386,989 were shaped to fit over the eyes, like glasses to reduce glare. But these devices like those described above could not simulate the environment of a motion picture theater if there was any light in the room because the ambient light would adversely affect the television picture.

None of the references cited above were concerned with the problem applicant has solved, i.e. simulating the environment of a motion picture theater without darkening the room.

SUMMARY OF INVENTION

A motion picture theatre environment takes place in a substantially darkened room with primarily the motion picture screen illuminated for viewing. To simulate this, when viewing television in a room which is not completely dark, two things are required. First a mask must be provided to cover the television set and some background so the light from the television screen is primarily visible. Second, a special spectacle frame is worn by the viewer which is designed so the ambient in the room appears to be substantially reduced and most of the light visible through the spectacle frame is from the television set picture. In this way, the room will appear comparatively dark, so that the television picture seen by the viewer will be the most prominent thing seen, just as if the viewer were in a motion picture theatre.

Other objects of this invention will become more apparent when better understood in the light of the accompanying specification and drawings wherein:

BRIEF DESCRIPTION OF THE DRAWINGS

FIG. 1 is an elevational perspective view of a viewing screen.

FIG. 2 is a rear perspective view of a clip-on light blocking device which fits over a pair of eye glasses and eliminates light coming through glasses from the top, bottom, sides and front of the eye glass frames except for a narrow slit in the light blocking device covering the glasses.

FIG. 3 is a side perspective view of the clip-on light blocking devices which clips on the glass frames by means of hooks.

FIG. 4 is a perspective view of a modified eyeglass like frame which blocks light coming from the top, sides and front, except for a narrow slit in front of the frame for persons who don't need glasses.

FIG. 5 is a perspective view of a modified viewing screen in an erect position designed to be rolled into a compact position for storage.

FIG. 6 is an enlarged perspective view of a portion of the modified viewing screen in FIG. 5 showing how the center and side frames are connected to the center portion of the viewing screen.

FIG. 7 is a further enlarged perspective view partly exploded of a portion of the modified viewing screen shown in FIG. 6.

DESCRIPTION OF PREFERRED EMBODIMENT

Referring now to FIG. 1 of the drawing, a viewing screen indicated generally by the reference numeral 5 is formed from a suitable material such as plastic, wood, cardboard etc. The viewing screen is formed in three parts, e.g. the center section 12, and opposing side sections 14, and 16. The side sections or panels 14 and 16 are foldable by means of fold lines 15 and 17, or hinges, or any other suitable device so that they can be folded over the center section 12 for compactness and storage.

The center section 12 has an opening 10 formed therein sized to closely surround a television screen in back of the viewing screen and in such a way that the back of the viewing screen abuts the television tube 18 but hides the rest of the television set cabinet, (not shown). In this way only the picture tube is visible through the viewing screen.

Since television sets come in various sizes, to accommodate several sizes of picture tubes, the viewing screen is provided with a suitable number of tear outs indicated by the dotted lines 20 which are positioned so that various television sets with different size tubes can be fitted in the opening 10 in the viewing screen 5. As shown in FIG. 1 the side sections 14 and 16 of the viewing screen are folded slightly toward the viewer to block out light coming from the back of the viewing screen. For reasons to become apparent below, the side of the viewing screen facing the viewer is painted black.

However, if there is any illumination in the room, the viewing screen 5 by itself will not simulate the environment of a motion picture theater. This requires an additional attachment 22 that fits over the eyes of the viewer and blocks out almost all light except the light coming through the television tube in the viewing screen. The additional attachments 22 are like clip on sun glasses which fit over ordinary glasses except that they are provided with light impervious shields 24 which are inserted where the glasses would be, or alternatively the shields could be inserted in spectacle frames in place of the glasses. These shields, when inserted in the spectacle frame surround the eye sockets and prevent light in the room from entering the eyes of the viewer through the sides and front of the spectacle frame. The shields are provided with a narrow slit 28 which permit only the light from the television screen to be seen by the viewer. The light impervious shields are adjustable in size because the viewers vary in size and it is necessary that the slits 28 be adjusted so that the eyes of the viewer looking through the slits cover a predetermined area around the viewing screen 12 surrounding the television tube 18. Without this arrangement any movement of the head of the viewer could cause eye strain and dizziness because the viewers eyes would have to always be focused directly on the television tube. So even though this surrounding area is black, motion of the head keeps the television tube 18 in view even if the viewer is not looking directly at the viewing screen. There are a number of ways to vary the size of the slits 28. One way is to make the shields 24 easily removable so that they can be replaced by other shields which have different size slits 28. Alternatively the size of the slits can be varied by using tape or some other method of changing the size. Light visible to the viewer is primarily limited to the light from the room. Light impervious shields 26, see FIGS. 2 and 4, surround the spectacle frames to prevent light from entering the viewers eyes through the top sides, and bottom of the spectacle frame.

To secure the additional attachment 22 to the spectacle frame, hooks 30 may be provided to hang on the top of the spectacle frame see FIGS. 2 and 3 although other ways of doing this are contemplated.

With this arrangement, if there is light in the room, except the light coming from the viewing screen, it is blocked from the viewers eyes by the light shield attachments 24 and 26. For reasons to be described below the, the surface of the viewing screen facing the viewer is painted black so the viewer sees the television tube on the viewing screen only through the slits 28 in light shield 24. In this way the environment of a movie theater is simulated.

In the event the viewer is not wearing prescription glasses, the glass frame 31 might be made as shown in FIG. 4 so the side, top, bottom, and front light shields are mounted in the frame with all light blocked out except for the slit 28 in the front of removable light shield 24. In this way, even if there is light in the room, the only light visible to the viewer is the light from the television screen.

At the present time many television sets are provided with remote controls, and the radiation from the remote control may not be able to penetrate the viewing screen 5 so that the remote control might be rendered ineffective. To overcome this possibility, the center panel 12 of the viewing screen in provided with slots 32 and 34 covered by a black cloth mesh. The mesh transmits the radiation from the remote control s that the remote control is not affected by the viewing screen. In addition, the viewing screen might muffle the sound from the television set, so the slots 36 and 38 may have an additional function in that speakers driven by the television set may also be positioned behind the slot 32 and 34 to increase the sound quality of the television set.

The viewing screen described in FIGS. 1 to 4 can be folded on fold lines 15 and 17. However even when the side portions 14 and 16 are folded over the center portion 12, the remaining portion 12 of the viewing screen would still be objectionably large.

Another modification of the viewing screen 10 described above is to make the center section 12 of the viewing screen part of a television cabinet, with the side sections 14 and 16 serving as doors of the cabinet which can be closed to cover the television tube. Of course the inside surfaces of the side sections and the surface of the center section would have to be painted black when the viewer is watching a motion picture being played on the television set.

As stated above in the modification shown in FIG. 1, when the side sections 14 and 16 are folded over the center section the resulting folded structure is bulky. To overcome this problem and make the viewing screen less bulky when stored away, another embodiment is required. In particular, the viewing screen 44 shown in FIGS. 5 to 7 can be rolled into a comparatively small space. This viewing screen includes vertical support rods 46 and 48 held erect by stanchions 50 and 52. The viewing screen comprises a center portion 54 and right and left side portions 56 and 58.

The viewing screen is composed of a cloth-like mesh so that the viewing screen forms comparatively planar surfaces when they are suspended from horizontal support rods 60, 62, and 64, something like curtain rods, see FIGS. 6 and 7

Two cylindrical connecting members 66 and 68 are mounted one on top of the other near the top of each of the rods 46 and 48, see FIG. 6. Cylindrical connecting members 66 are provided with a rod receiving opening 70 sized to receive and support rod 62, see FIG. 6. Cylindrical connecting member 68 is provided with a rod receiving opening 70 sized to receive and support rod 60. The structure holding horizontal support rods 60 and 6 together is the same as the structure holding support rods 62 and 60 together.

Rods 46 and 48 are provided with a plurality of vertically spaced pin receiving holes 74 formed therein sized to receive pins 76, see FIGS. 6 and 7. In this way the height of the viewing screen can be adjusted by inserting pin 74 into one of the holes 74. In addition the top surface 78 of cylindrical member 66 is provided with a single pin receiving hole 80 sized to permit a pin 82 to extend therethrough, see FIG. 7.

The top surface 84 of cylindrical member 68 is provided with a plurality of pin receiving holes 86 disposed on the periphery of a circle, see FIG. 7. Cylindrical member 66 is rotatably mounted on support 48. In this way by rotating the cylindrical member 66, the pin 82 can enter any of the circularly disposed pin receiving holes 86, and since the angular position of support rod 62 from which the left viewing panel 58 is suspended can be varied, the angle the left and right viewing panels 56 and 58 makes with the center panel can be varied to obstruct ambient light conditions coming from the back of the screen.

To this point, it can be seen that the height of the screen can be adjusted to accommodate the position of the television tube, and the angle of the side panels 58 and 56 can be varied for optimum viewing.

The mesh cloth can be held to the support rods 64 and 66 by means of velcro 88 or some other suitable material, as shown in FIG. 5.

It is noted that the viewing screen 44 also requires the light obstructing portions on the glasses like frame shown in FIGS. 2, 3, and 4. However since the mesh cloth transmits sound and radiation, the screen, which is black in color permits the television remote control to be used and permits speakers in back of the viewing screen 44 to transmit sound.

When the viewing screen is to be put away, the pins 76 and 80 are removed. Then the top support rods 62 and 64 are pulled out of the cylindrical members 66 and 68. Then the side and center panels are rolled up on the support rods 60, 62 and 64 leaving just three rolls of mesh cloth to be put away in any convenient closet.

Having described the invention, what I claim as new is:

1. A television viewing device comprising in combination a viewing screen adapted to abut the television tube, said viewing screen having an opening formed therein surrounding the television tube so the television picture can be viewed, and a pair of light obstructing spectacle frames having attached light blocking shields for preventing ambient light in the room from entering the eyes of the viewer through the sides, top and bottom of the spectacle frame, the front of said spectacle frame having front light blocking shields with a narrow slit in each light shield, means for varying the width of said narrow slit for preventing too much light from entering said spectacle frame through said narrow slit for better comfort of the viewer, said viewing screen painted black so that the ambient light in the room perceptable to the viewer is substantially reduced and almost all light entering the eyes of the viewer through said slit in each light blocking shield comes from the television picture whereby the environment of a motion picture theatre is simulated.

2. The television viewing device described in claim 1 including means for reducing the size of the viewing screen for storage.

3. The television viewing device described in claim 2 wherein said viewing screen includes a center panel and left and right panels, said center panel having an opening formed therein, said opening the size of said television tube, whereby the picture on the television tube is visible through said opening.

4. The television viewing device described in claim 3 including means for varying the size of said opening to accommodate different size television tubes.

5. The television viewing device described in claim 3 wherein mesh covered openings are formed in the viewing screen so that radiation from a remote control device for the television set can penetrate the viewing screen and operate the television set.

6. The television viewing device described in claim 5 wherein said mesh covered openings transmit sound without attenuation so that speakers can be positioned behind said viewing screen.

7. The television viewing device described in claim 3 wherein said left and right panels are foldably connected to said center panel so that the left and right panels can be folded over the center panel to reduce the size of the television viewing screen when the viewing screen is to be stored.

8. A television viewing device comprising in combination a viewing screen having left and right panels and a center panel, said center panel of said viewing screen having an opening formed therein surrounding the television tube so the television picture can be viewed, said television screen formed from a cloth-like mesh screen and including vertical supports for holding said mesh screen in an erect position and including height adjusting means for raising and lowering said mesh screen, means for changing the angular relationship between said left and right side panels of said viewing screen with respect to said center panel to prevent ambient light at the rear of said viewing screen from reaching the front of said viewing screen.

9. The television viewing device described in claim 8 wherein the cloth-like mesh screen is held erect by vertically mounted support rods, one support rod connecting the left panel of the viewing screen with the center panel and the other support rod connecting the right panel of the viewing screen with the center panel, a horizontal support member mounted on the top of the left and right mesh panels, a pair of cylindrical members mounted one on top each other near the top of each of said support rods, the top cylindrical member having an opening sized to receive one of the horizontal support members holding up one of the side panels, the lower cylindrical member having an opening sized to receive the horizontal support member holding up the center panel, the top surface of the lower cylindrical support member having a plurality of pin receiving holes mounted on the periphery of a circle, a vertically downwardly extending pin receiving hole formed in the top surface of the upper cylindrical connecting member; a first pin, said first pin sized to be insertable into said downwardly extending hole on the upper surface of said upper cylindrical connecting member and on into one of the pin receiving holes mounted on the periphery of a circle formed on the upper surface of said lower cylindrical connecting member whereby the angular relationship between the side panels and center panel of the view screen can be varied, each of said vertical supports having a plurality of vertically disposed horizontally extending pin receiving holes formed therein, a second pin, said second pin pin insertable into one of said vertically disposed pin receiving holes on each support, whereby the height of said screen could be varied.

10. The television viewing device described in claim 9 wherein said screen can be dismantled for storage by removing said pins and said horizontal support rods from said cylindrical connecting members thereby separating said side and front panels which can be rolled up on the horizontal support rods for storage.

* * * * *